United States Patent [19]

Muller

[11] 4,390,950
[45] Jun. 28, 1983

[54] ANGLE OF ATTACK BASED PITCH GENERATOR AND HEAD UP DISPLAY

[75] Inventor: Hans R. Muller, Redmond, Wash.

[73] Assignee: Sundstrand Corporation, Rockford, Ill.

[21] Appl. No.: 210,771

[22] Filed: Nov. 28, 1980

[51] Int. Cl.³ .................... G01C 23/00; G06G 7/78
[52] U.S. Cl. .................................. 364/434; 244/181; 73/178 R
[58] Field of Search .................. 364/434, 435; 340/27 NA; 244/181; 73/178 R

[56] References Cited

U.S. PATENT DOCUMENTS

| | | | |
|---|---|---|---|
| 3,594,553 | 7/1971 | McElroy | 364/435 X |
| 3,618,878 | 11/1971 | Klein et al. | 244/181 X |
| 3,686,626 | 8/1972 | Bateman | 364/435 X |
| 3,744,309 | 7/1973 | Astengo | 73/178 R |
| 3,809,867 | 5/1974 | Hattendorf | 364/434 |
| 3,851,303 | 11/1974 | Muller | 340/27 NA |
| 3,860,800 | 1/1975 | Simpson | 364/434 X |
| 3,901,466 | 8/1975 | Lanbregts | 364/434 X |
| 3,930,610 | 1/1976 | Hache | 244/181 X |
| 3,967,799 | 7/1976 | Muller | 364/434 X |
| 4,012,713 | 3/1977 | Greene et al. | 340/27 R |
| 4,044,975 | 8/1977 | Blechen et al. | 244/181 |
| 4,092,716 | 5/1978 | Berg et al. | 364/434 X |
| 4,095,271 | 6/1978 | Muller | 364/434 |

FOREIGN PATENT DOCUMENTS

| | | |
|---|---|---|
| 815137 | 6/1959 | United Kingdom . |
| 1002552 | 8/1965 | United Kingdom . |
| 1358755 | 7/1974 | United Kingdom . |
| 1553407 | 9/1979 | United Kingdom . |

*Primary Examiner*—Edward J. Wise
*Attorney, Agent, or Firm*—Wegner, McCord, Wood & Dalton

[57] ABSTRACT

A circuit for computing a signal representing the pitch attitude of an aircraft utilizes angle of attack based information and the output of a gyroscope to produce a calculated pitch signal which has a long term component dependent upon the angle of attack based information and a short term component dependent upon the gyroscope output signal. The calculated pitch signal may be used to pitch stabilize a head up display in the aircraft and in this event is modified with a correction signal derived from the pitch signal and the output of a head up display mounted accelerometer. Alternatively, the pitch signal may be combined with a signal representing the difference between the output of the display mounted accelerometer and the output of an angle of attack vane mounted accelerometer to provide a pitch stabilization signal which is free of turn and shear errors.

20 Claims, 7 Drawing Figures

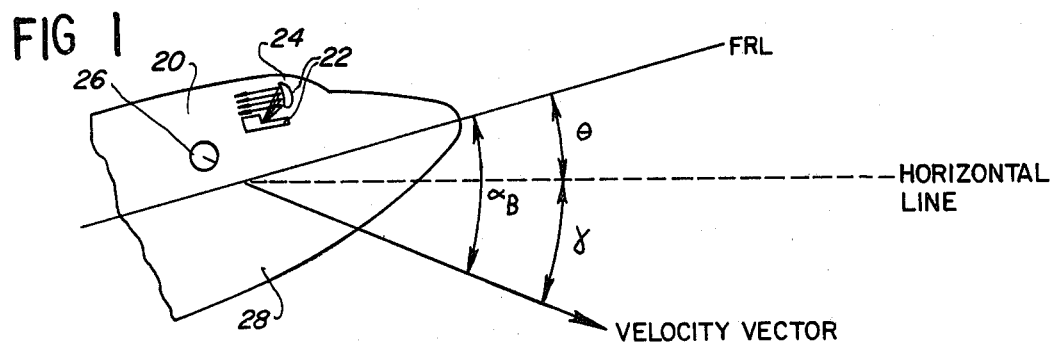
FIG. 1
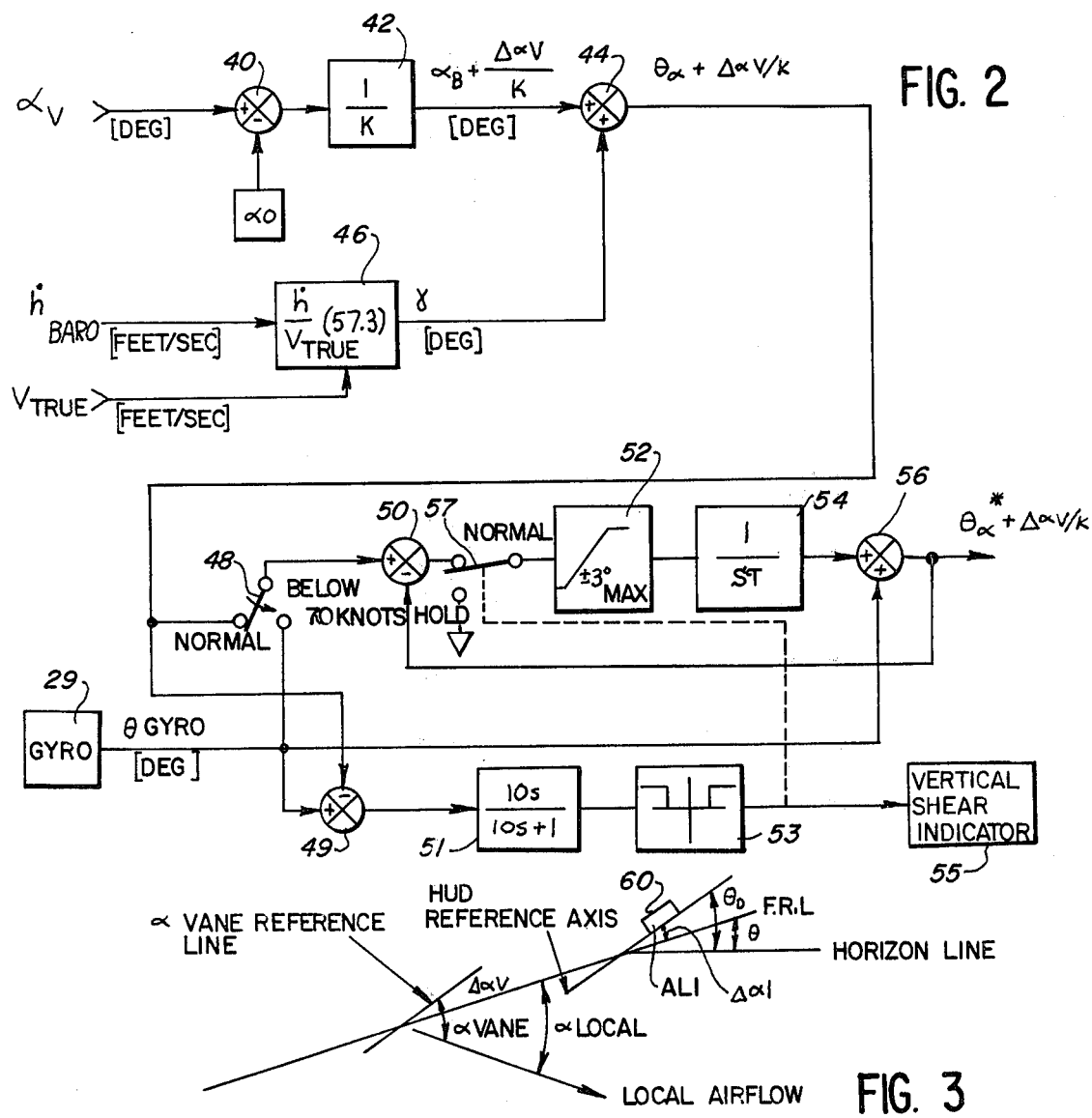
FIG. 2
FIG. 3

ANGLE OF ATTACK BASED PITCH GENERATOR AND HEAD UP DISPLAY

BACKGROUND OF THE INVENTION

This invention relates to means for generating a pitch signal which is unaffected by wind shears and turns errors and more particularly to generating a pitch stabilization signal for a head up display which has a long term component derived from an angle of attack signal and a short term signal derived from a gyroscope signal.

Prior art pitch computation circuits are disclosed in Muller U.S. Pat. No. 3,851,303 and Muller U.S. Pat. No. 4,095,271, both assigned to the assignee of this application.

In Muller U.S. Pat. No. 3,851,303, a longitudinal accelerometer signal is modified by a differentiated air speed signal and is combined with a gyroscope signal to provide an indication of the pitch attitude of the aircraft. However, the differentiated air speed signal is subject to wind shear error, thereby decreasing the accuracy of the generated pitch signal.

Muller U.S. Pat. No. 4,095,271, discloses a pitch generator circuit which generates a pitch signal derived from a head up display mounted accelerometer which is calibrated to the display reference axis so that it indicates the pitch angle of the reference axis during steady state, i.e. unaccelerated flight conditions. The accelerometer output is compensated for horizontal acceleration by subtracting the air speed rate to generate a display reference computed pitch signal. This accelerometer derived pitch signal is used as a long term pitch reference and is combined with the gyroscope output for short term pitch excursions. This is accomplished by correcting the gyro pitch signal at a slow and limited rate to the long term reference.

A system disclosed in Greene U.S. Pat. No. 4,012,713, utilizes the output of a longitudinal accelerometer and a differentiated air speed signal to provide a wind shear signal. The signal is fed to appropriate indicator means to alert the pilot or other aircraft of the existence of a dangerous wind shear condition.

These types of systems work satisfactorily under normal conditions or where relatively short term wind shears are present. However, when wind shear conditions of long duration are encountered, the computed long term pitch reference may be in error due to the mismatch between inertial and air mass acceleration, since air mass acceleration is used to compensate for inertial acceleration. In certain wind shear conditions, the computed pitch output may be slowly forced to an erroneous long term pitch reference.

This long term wind shear error can be minimized by reducing the gyro correction slew rate. In so doing, however, gyro erection errors due to slow erection of the gyro platform to the dynamic vertical, as well as errors accumulated during turns cannot be fully compensated. This is especially true during shear conditions where both gyro errors as well as the long term pitch reference errors tend to increase in the same direction, and hence become additive.

SUMMARY OF THE INVENTION

It is therefore an object of the invention to provide a circuit for computing the pitch attitude of an aircraft utilizing angle of attack information for long term pitch excursions, and gyroscope signals for short term pitch information.

It is an additional object of the invention to provide a pitch computation circuit which generates a stabilization signal for a head up display which indicates the pitch attitude of the aircraft regardless of wind shear conditions.

It is another object of the invention to provide a pitch generator circuit which utilizes a signal from an accelerometer mounted on the head up display and another signal from an accelerometer mounted on an angle of attack vane to produce an output signal which is completely free of acceleration and shear errors and which minimizes misalignment errors of the accelerometers.

More particularly, a signal representing the body angle of attack is combined with the air mass flight path angle to derive a first pitch signal representing a long term angle of attack pitch signal. This signal is used to generate an error signal which is combined with the gyroscope output after being limited and integrated to provide a calculated pitch signal which depends upon the first pitch signal for long term pitch information and upon the gyroscope signal for short term pitch information.

In a first embodiment of the invention, the calculated pitch signal may be combined with an output signal of an accelerometer mounted on the head up display. The resultant signal is filtered and subtracted from the pitch signal to produce a long term acceleration signal, which in turn is used to obtain a second error signal. This error signal is integrated over time to obtain a correction signal which is subtracted from the calculated pitch signal to derive a pitch stabilization signal for the head up display. Moreover, the integrator may be disconnected from the limiter to prevent loading the integrator with false information in the event that an unusual attitude or a dynamic flight condition exists.

In a second embodiment of the invention, the calculated pitch signal may be combined with a signal representing the difference between the output of the head up display mounted accelerometer and an angle of attack vane mounted accelerometer. The difference signal is filtered to eliminate the high frequency components before adding it to the calculated pitch signal. The resultant display stabilization signal is free of turn and shear errors, and misalignment errors due to the angle of attack vane and the head up display mounted accelerometers are reduced significantly.

BRIEF DESCRIPTION OF THE DRAWINGS

FIG. 1 is a diagrammatic illustration of an aircraft with a head up display for pitch related visual information used in monitoring the approach of the aircraft to a landing;

FIG. 2 is a functional block diagram of a circuit for generating a pitch signal;

FIG. 3 is a schematic diagram showing the alignment geometry of the head up display mounted accelerometer and the angle of attack vane;

DESCRIPTION OF THE PREFERRED EMBODIMENT

Figure 4:
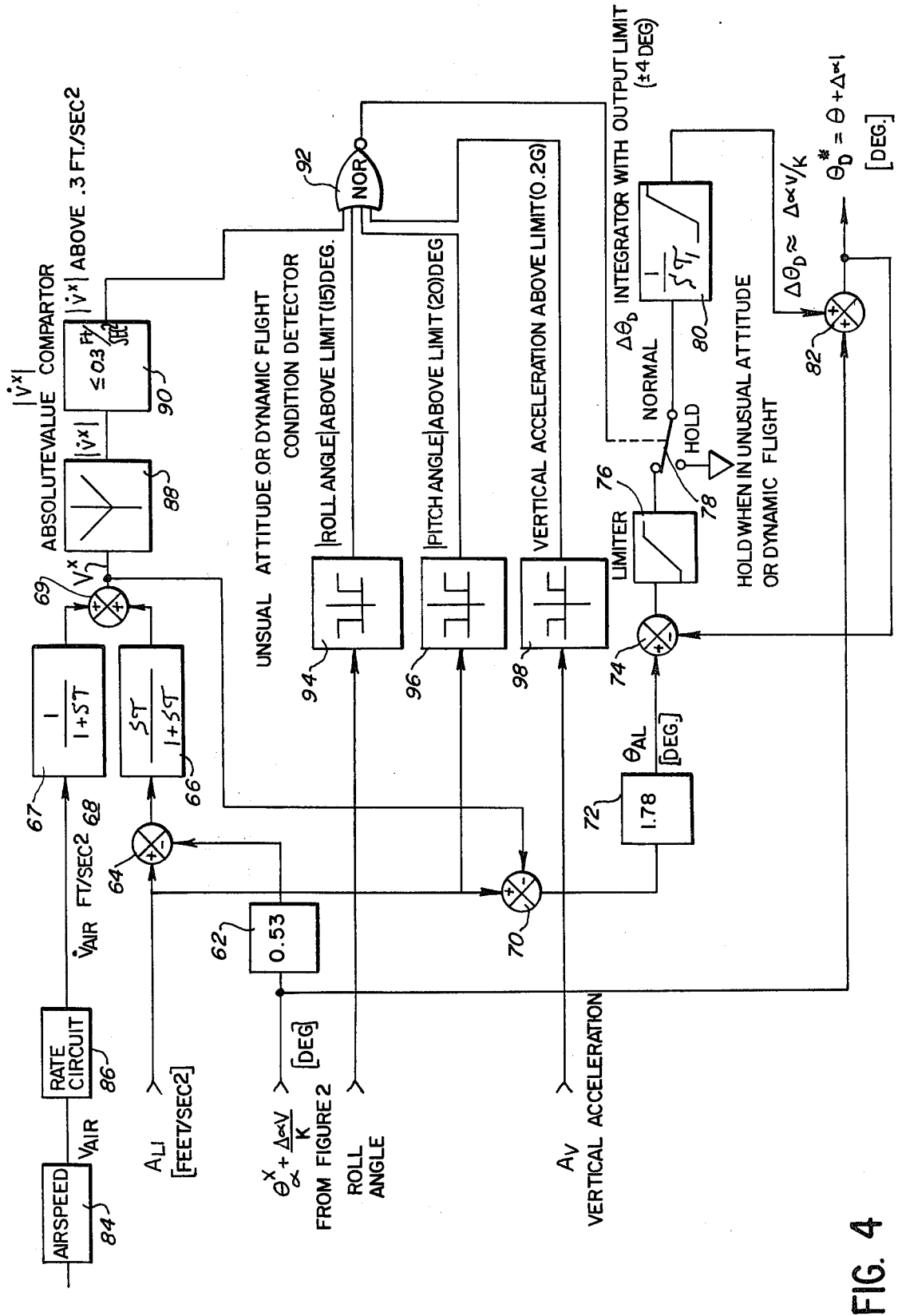
FIG. 4 is a functional block diagram of a circuit for generating a pitch stabilization signal from the computed pitch signal of FIG. 2.

The present invention is illustrated and described herein for use with a head up display system which provides pitch and flight path information to a pilot for assisting the guidance of the aircraft. However, some features of the invention are useful in providing a head up display of other pitch related information or for generating an accurate pitch signal for other purposes, such as a flight guidance system.

Referring to FIG. 1, an aircraft 20 has a head up display 22 which projects pitch related information onto a combiner screen 24 located between the pilot and the outside world. The head up display, or HUD 22 may be of the form disclosed in Bateman U.S. Pat. No. 3,654,806; Bateman U.S. Pat. No. 3,686,626; Kirschner see insert U.S. Pat. No. 3,816,005 or Mieller U.S. Pat. No. 3,851,303 which are assigned to the assignee of this application.

An angle of attack derived pitch signal, denoted $\theta_\alpha$, utilizes a relationship between a body angle of attack, denoted $\alpha_B$, which is the air velocity vector in relation to the fuselage reference line, or FRL, and an air mass flight path angle $\gamma$. For the aircraft pitch attitude shown in FIG. 1:

$$\alpha_B = \theta_\alpha - \gamma$$

or, rearranging $$\theta_\alpha = \alpha_B + \gamma$$

The body angle of attack $\alpha_B$ may be computed from a local air flow angle $\alpha_L$ which is measured by an angle of attack vane 26 located on the fuselage 28 of the aircraft 20. In general, the angle $\alpha_V$ measured by the angle of attack vane 26, is related to the local air flow angle $\alpha_L$ by the following equation:

$$\alpha_V = \alpha_L + \Delta\alpha_V$$

or, rearranging $$\alpha_L = \alpha_V - \Delta\alpha_V$$

The local air flow angle $\alpha_L$ is also related to the body angle of attack $\alpha_B$ by the following equation:

$$\alpha_L = \alpha_o + K\alpha_B$$

Rearranging and substituting for $\alpha_L$:

$$\alpha_B = \frac{\alpha_V - \Delta\alpha_V - \alpha_o}{K}$$

where $\alpha_o$ and $K$ are aerodynamic constants determined during empirical flight testing and $\Delta\alpha_V$ is the angle of attack probe 26 error relative to the reference datum to which $\alpha_o$ and $K$ have been determined.

The quantity $\alpha_B$ may then be substituted into the equation for $\theta_\alpha$ to obtain the result:

$$\theta_\alpha = \frac{\alpha_V - \alpha_O}{K} - \frac{\Delta\alpha_V}{K} + \gamma$$

The quantity $\gamma$ may be obtained by dividing the barometric altitude rate, denoted $\dot{H}_{BARO}$ by the true air speed, or $V_{true}$ and multiplying the result by 57.3. The true air speed may be obtained from an air data computer or by other sources of information. The barometric altitude rate may be obtained by differentiating the output of a barometric altimeter (not shown) which may be a part of the instrumentation of the aircraft 20.

The long term accuracy of the angle of attack based pitch signal $\theta_\alpha$ depends upon the effect that horizontal and vertical winds and shears have on the angle of attack $\alpha_B$ and upon the air mass flight path angle $\gamma$. Generally, wind and shear errors tend to cancel in the computation of the angle of attack based pitch signal $\theta_\alpha$.

FIG. 2 illustrates a pitch calculator system incorporating the invention wherein the output from the angle of attack vane 26 is utilized to provide a long term pitch signal and wherein the output from a gyroscope 29 is utilized to provide short term pitch information.

The output $\alpha_V$ of the angle of attack vane 26 is coupled to a summing circuit 40 where it is decreased by an amount equal to the constant $\alpha_O$. This signal is then multiplied by a factor of (1/K), by a multiplier circuit 42 resulting in a signal equal to:

$$\frac{\alpha_V - \alpha_O}{K}$$

which in turn is equal to:

$$\alpha_B + \frac{\Delta\alpha_V}{K}$$

This signal is added in an adding circuit 44 to the air mass flight path angle $\gamma$, which is obtained by dividing the barometric altitude rate $\dot{H}_{BARO}$ by the true air speed $V_{true}$ and by multiplying the quotient by 57.3 in a multiplier circuit 46.

The summation of the two signals in the summing circuit 44 produces an output signal which is equal to:

$$\alpha_B + \frac{\Delta\alpha_V}{K} + \gamma = \theta_\alpha + \frac{\Delta\alpha_V}{K}$$

This signal is coupled to a summing circuit 50 through a switch contact 48 and is limited by a limiter 52 to a plus or minus 3° maximum swing. This signal is then integrated by an integrator 54 to filter the short term dynamic disturbances of the signal.

The integrated signal from the integrator 54 is summed with the gyro output, denoted $\theta_{gyro}$, in a summing circuit 56 to provide a calculated pitch output $\theta_\alpha{}^* + (\Delta\alpha_V/K)$ which is indicative of the pitch attitude of the aircraft 20 but which contains a constant component equal to $(\Delta\alpha_V/K)$. The output signal from the summing circuit 56 is coupled back to the summing circuit 50, which subtracts this signal from the output of the summing circuit 44 to produce an error signal. The error signal is integrated over time to develop a correction signal which is added to the gyroscope signal $\theta_{gyro}$ to decrease long term errors which may be due to long duration wind shears.

To prevent loading of the integrator 54 with false information, such as during takeoff when the air speed is below a predetermined value, for example, 70 knots, the switch contact 48 disconnects the output of the summing circuit 44 from the input of the summing circuit 50 and couples the output $\theta_{gyro}$ of the gyroscope 29 to the input of the summing circuit 50. Under these conditions, the output from the summing circuit 56 is the signal $\theta_{gyro}$ only.

The limiter 52 and the time constant $\tau$ of the integrator 54 are chosen such that the short term dynamic disturbances of the raw $\theta_\alpha$ signal are filtered adequately, yet typical gyro sources, such as platform erection during acceleration and turn errors, are eliminated. The resulting output signal follows the gyro pitch signal for short term changes and the $\alpha_V$ based pitch signal for long term variances.

The output from the summing circuit 44 is subtracted from the gyroscope signal $\theta_{gyro}$ at a summing junction 49 to obtain a signal representing the vertical shear to which the aircraft is subjected. This signal is filtered in a washout circuit 51 which eliminates the short term dynamic components thereof to obtain a signal $VS_L$ representing the long term vertical windshear. The signal $VS_L$ is coupled to a comparator circuit 53 which provides an output signal to a vertical shear indicator 55 in the event the vertical windshear exceeds predetermined limits. Moreover, in the event a signal is generated by the comparator circuit 53, a switch contact 57 disconnects the limiter 52 and the integraor 54 from the summing circuit 50 and connects them to ground to prevent the calculated pitch outpu $\theta_\alpha^* + (\Delta\alpha_V/K)$ from being affected by long term vertical windshears. During this time, the output of the integrator 54 is maintained at a constant level by connecting the switch contact 57 to ground.

The offset error $(\Delta\alpha_V/K)$ is a constant which does not vary once the angle of attack probe 26 is installed. The output from the circuit of FIG. 2 may be used as part of a conventional HUD system or may be used in other types of applications which require accurate pitch information, such as flight path guidance system.

Referring now to FIGS. 3 and 4, there is illustrated a system which generates a pitch stabilization signal from the output signal of the circuit of FIG. 2 and eliminates the error introduced by the angle of attack probe 26 misalignment. The circuit of FIG. 4 is particularly suited for use in a head up display which requires a pitch signal for stabilization of the display.

In FIG. 3, a longitudinal accelerometer 60 is mounted directly on the HUD platform and the HUD display unit 22 is calibrated such that when it is positioned with its reference axis level and with a zero pitch input signal, the displayed horizon line overlays the true horizon. The output of the longitudinal accelerometer 60, denoted $A_{L1}$, is calibrated to read true pitch when the HUD reference axis is in nominal alignment to the fuselage reference line FRL while operating under static conditions. Once the HUD 22 and the longitudinal accelerometer 60 are installed in the aircarft, any misalignment error $\Delta\alpha_1$ of the longitudinal accelerometer 60 must be compensated for by a pitch stabilization signal, denoted $\theta_D$, which is equal to the sum of a true pitch angle $\theta$ and the misalignment error $\Delta\alpha_1$.

The computed pitch stabilization circuit illustrated in FIG. 4 eliminates the angle of attack probe 26 misalignment error of the output signal computed in FIG. 2 by slowly correcting the long term component of the $\theta_\alpha^* + (\Delta\alpha_V/K)$ signal to the angle measured by the HUD reference axis mounted accelerometer 60.

The output signal $\theta_\alpha^* + (\Delta\alpha_V/K)$ is multiplied by a factor of 0.53 in a multiplier circuit 62 and is subtracted from the output $A_{L1}$ of the HUD mounted accelerometer 60 in a summing circuit 64. The output of the summing circuit 64 is filtered by a filter circuit 66, which comprises a portion of a complimentary filter circuit 68. The transfer function for the filter circuit 66 is such that the long term components of the output signal from the summing circuit 64 are eliminated. The resulting high frequency components are then passed to another summing circuit 69.

The air speed of the aircraft is detected by an air speed sensor 84 and is differentiated by a rate circuit 86 to provide an air speed acceleration signal $\dot{V}_{AIR}$. This signal is an input to a filter circuit 67 which is part of the complimentary filter circuit 68. The output of the filter 67 is added in a summing circuit 69 to the output of the filter 66 to provide a signal denoted $\dot{V}^*$, which consists of a long term component from the filter circuit 67 and a short term component from the filter circuit 66. The time constant $\tau$ of the complimentary filter 68 may be made relatively long to minimize the effect of wind shears.

The signal $\dot{V}^*$ from summing circuit 69 is subtracted from the output signal $A_{L1}$ of the HUD mounted accelerometer 60 which, after being multiplied by a factor of 1.78 in a multiplier circuit 72, provides an output signal $\theta_{AL}$ which represents the long term pitch signal measured by the HUD mounted accelerometer 60.

An output $\theta_D^*$, which is the pitch stabilization signal output, is subtracted from the signal $\theta_{AL}$ in a summing circuit 74 to provide a second error signal which is limited by a limiter circuit 76. The output of the limiter 76 is integrated and further limited by an integrator circuit 80 to develop a second correction signal $\Delta\theta_D$ which is approximately equal to the quantity $(\Delta\alpha_V/K)$. This signal is subtracted in a summing circuit 82 from the output signal $\theta_\alpha^* + (\Delta\alpha_V/K)$ from the circuit shown in FIG. 2. The output $\theta_D^*$ of the summing circuit 82 is then equal to the true pitch $\theta$ plus the HUD alignment error $\Delta\alpha_1$.

To prevent loading the integrator 80 with false information which would cause the $\theta_D^*$ signal to be slewed to the dynamic vertical measured by the HUD accelerometer 60 in the event of an unusual attitude or dynamic flight condition, logic circuits are provided to disconnect the integrator 80 from the limiter 76 under a specified set of circumstances.

The signal $\dot{V}^*$ from the summing circuit 69 is passed through an absolute value circuit 88 and is coupled to a comparator 90, which provides an output signal in the event that $\dot{V}^*$ rises above 0.3 ft/sec.$^2$. The output of the comparator 90 is then coupled to one input of a NOR gate 92.

Other inputs to the NOR gate 92 are provided by a series of comparator circuits 94, 96 and 98. The comparator circuit 94 provides a signal in the event that the roll angle rises above a predetermined upper limit, such as 15°. Similarly, the comparator circuit 96 receives as its input the output signal $A_{L1}$ from the HUD mounted accelerometer 60 and provides an output when the pitch rises about a particular limit, such as 20°. The comparator circuit 98 provides an output to the NOR gate 92 in the event that the vertical acceleration exceeds an upper limit, such as 0.2 times the acceleration of gravity. The roll angle and the vertical acceleration may be provided by an Air Data computer or by accelerometers mounted with the aircraft.

The NOR gate 92 will cause a switch contact 78 to disconnect the limiter 76 from the integrator 80 in the event that one of the comparators 90, 94, 96 or 98 indicates that an unusual attitude or a dynamic flight condition exists. This logic circuitry avoids slewing of the $\theta_D{}^*$ signal to the dynamic vertical measured by the HUD mounted accelerometer 60 by preventing the error signal $\Delta\theta_D$ from accumulating to an abnormally high value.

Once the logic circuitry detects that an unusual condition no longer exists, the NOR circuit 92 causes the switch contact 78 to reconnect the limiter 76 to the integrator 80, allowing resumption of normal operation.

The accuracy of the circuit of FIG. 4 depends upon the fact that the two alignment error angles ($\Delta\alpha_V/K$) and $\Delta\alpha_1$ do not change at all or very little during approach to the runway. The resulting output signal $\theta_D{}^*$ is then equal to the true pitch $\theta$ plus the HUD alignment error $\Delta\alpha_1$ and may be used to pitch stabilize the HUD symbology.

Figure 5:
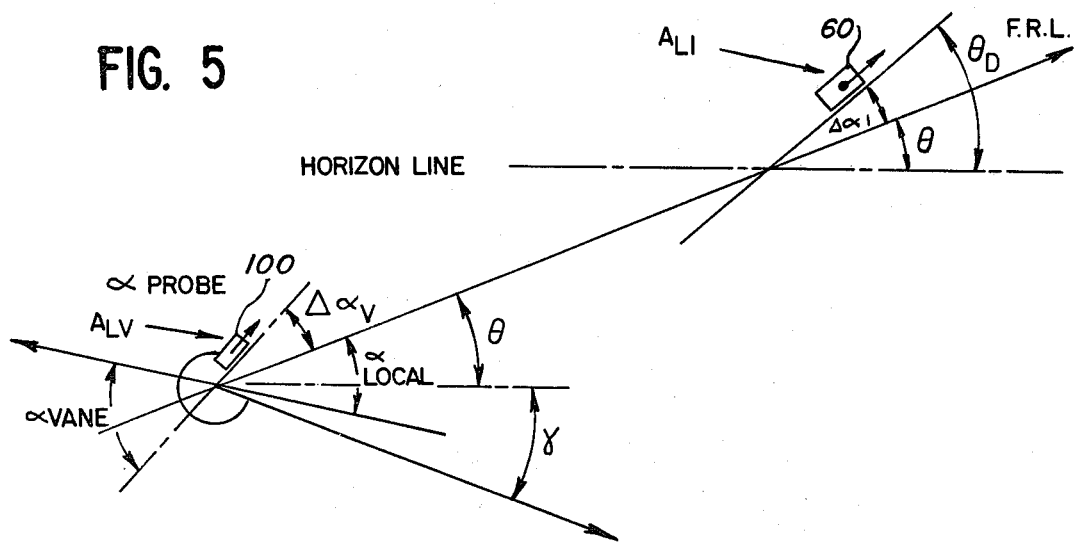
FIG. 5 is a schematic diagram showing the alignment geometry of an angle of attack probe mounted accelerometer and a head up display mounted accelerometer.
Figure 6:
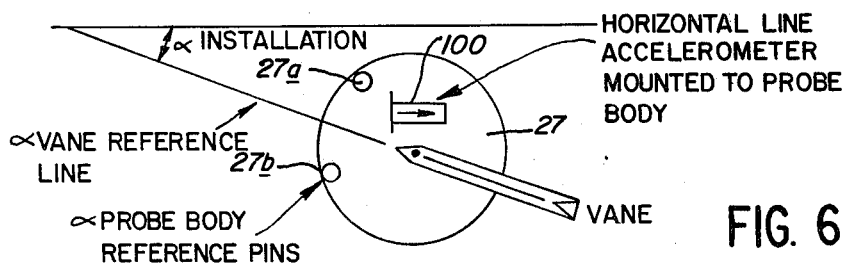
FIG. 6 is a diagrammatic illustration of an angle of attack vane with an accelerometer mounted thereon.
Figure 7:
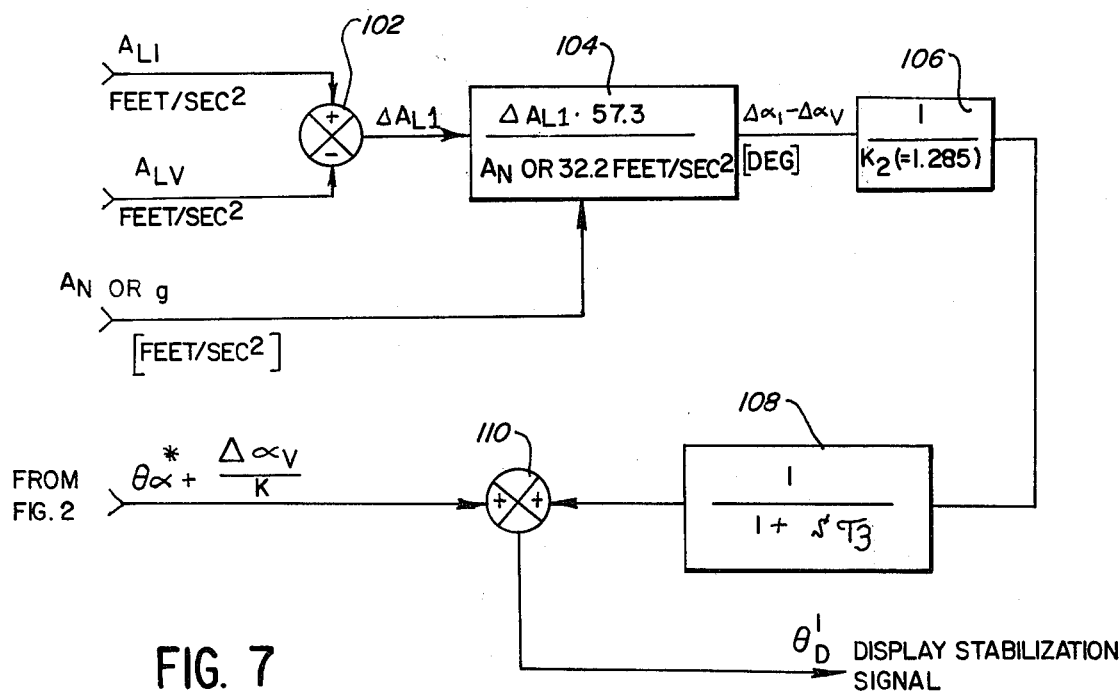
FIG. 7 is a functional block diagram of an alternative embodiment of a circuit for generating a display stabilization signal from the computed pitch signal of FIG. 2.

Referring to FIGS. 5, 6 and 7, a second embodiment of a pitch stabilization circuit is shown which utilizes an angle of attack probe 26 mounted accelerometer 100. This embodiment of the computed pitch circuit results in generation of a $\theta_D$ signal completely free of acceleration and therefore shear errors. This embodiment of the invention may be used in conjunction with the circuit shown in FIG. 2 in place of the circuit of FIG. 4.

The angle of attack probe mounted accelerometer 100, shown in FIGS. 5 and 6, is mounted on a probe body 27 of the angle of attack probe 26 and is aligned to give a zero indication under static conditions.

The angle of attack probe 26 is normally calibrated to the wing chord plane through the use of a pair of probe reference pins 27a and 27b; however, small alignment errors in relation to the FRL are possible. The accelerometer 100 output, denoted $A_{LV}$, indicates this misalignment error $\Delta\alpha_V$ when compared with the HUD unit mounted accelerometer 60. The ideal pitch stabilization signal $\theta_D$ could be computed from $\theta_\alpha$ if $\Delta\alpha_V$ and $\Delta\alpha_1$ were known. The two misalignment angles $\Delta\alpha_V$ and $\Delta\alpha_1$ are not known directly, however, the difference between the two may be computed from the following equations:

$$A_{LV} \approx g(\theta + \Delta\alpha_V) + A_H$$

$$A_{L1} \approx g(\theta + \Delta\alpha_1) + A_H$$

where $A_H$ is the horizontal acceleration of the aircraft, g is the gravitational constant and $\theta$ is the true pitch. Subtracting $A_{LV}$ from $A_{L1}$ yields the result:

$$A_{L1} - A_{LV} = g(\Delta\alpha_1 - \Delta\alpha_V)$$

or, rearranging:

$$\Delta\alpha_1 - \Delta\alpha_V = \frac{A_{L1} - A_{LV}}{g}$$

As illustrated in FIG. 5, the ideal pitch stabilization signal $\theta_D$ is equal to the true pitch angle plus the misalignment angle $\Delta\alpha$, of the HUD mounted accelerometer 60. If instead, the angle of attack based pitch signal $\theta_\alpha$ from FIG. 2 is used, then:

$$\theta_D = \frac{\alpha_V}{K} - \frac{\alpha_O}{K} - \frac{\Delta\alpha_V}{K} + \gamma + \Delta\alpha_1$$

where $\alpha_O$ and K are constants measured during flight testing.

The quantity $\Delta\alpha_1 - (\Delta\alpha_V/K)$ is not directly known; however, if the local air flow angle to body angle scale factor K were equal to 1, then $\theta_D$ would be equal to:

$$\theta_D = \alpha_V - \alpha_O + \gamma + \Delta\alpha_1 - \Delta\alpha_V$$

And, since:

$$\Delta\alpha_1 - \Delta\alpha_V = \frac{A_{L1} - A_{LV}}{g}$$

$\theta_D$ may be computed from measurements of $\alpha_V$ and $A_{L1} - A_{LV}$. However, since K is normally between 1.5 and 2, only an approximation to $\theta_D$ may be calculated.

An approximate pitch stabilization signal $\theta_D{}^1$ may be calculated by utilizing the relation:

$$\Delta\alpha_1 - \frac{\Delta\alpha_V}{K} \approx \frac{\Delta\alpha_1 - \Delta\alpha_V}{K_2}$$

where $K_2$ is a constant gain factor independent of the constant K. By substituting the approximation into the equation for $\theta_D$, an equation for $\theta_D{}^1$ is obtained:

$$\theta_D{}^1 = \frac{\alpha_V}{K} - \frac{\alpha_O}{K} + \gamma + \frac{\Delta\alpha_1 - \Delta\alpha_V}{K_2}$$

To obtain the magnitude of the error of the approximation for $\theta_D$, $\theta_D{}^1$ 15 subtracted from $\theta_D$:

$$\Delta\theta_D = \theta_D - \theta_D{}^1 = \Delta\alpha_1\left(1 - \frac{1}{K_2}\right) + \Delta\alpha_V\left(\frac{1}{K_2} - \frac{1}{K}\right)$$

The error signal $\Delta\alpha$ thus contains two components, one proportional to $\Delta\alpha_V$ and the other proportional to $\Delta\alpha_1$.

The gain factor $K_2$ may be chosen such that the error contribution of $\Delta\alpha_V$ and $\Delta\alpha_1$ are equal. If $K_2$ is so chosen, misalignment errors of the angle of attack probe accelerometer 100 and of the HUD display mounted accelerometer 60 are reduced approximately by a factor of 5. Assuming that K is equal to 1.8, then equal error contributions of $\Delta\alpha_V$ and $\Delta\alpha_1$ result in the value of $K_2$ being equal to 1.285.

Referring to FIG. 7, the output $A_{LV}$ from the angle of attack probe mounted accelerometer 100 is subtracted from the output $A_{L1}$ of the HUD mounted accelerometer 60 in a summing circuit 102. The resultant signal, denoted $\Delta A_{L1}$, is multiplied by a factor of 57.3 and is divided by the gravitational constant g in a multiplier circuit 104. The output of the multipler circuit 104 is then equal to $\Delta\alpha_1 - \Delta\alpha_V$ and this signal is divided by the gain factor $K_2$, which is equal to 1.285, in a circuit 106. The output of the divider circuit 106 is modified by a filtering circuit 108 which eliminates the high frequency components of the signal, and is then added to the output signal $\theta_{60}{}^* + (\Delta\alpha_V/K)$ of the circuit shown in FIG. 2 in a summing circuit 110.

The output of the summing circuit 110 is then equal to the approximate display stabilization signal $\theta_D{}^1$, and is completely independent of horizontal accelerations, due to the fact that $A_{L1}$ and $A_{LV}$ are subtracted and hence the horizontal acceleration term $A_H$ is cancelled. This independence relies upon the assumption that the output signal from the circuit of FIG. 2 is not affected by winds and shears due to the cancellation effect of $\gamma$ and $\alpha_B$.

I claim:

1. A pitch calculating circuit for providing a pitch signal representative of the pitch of an aircraft, comprising:
   means for developing a first signal representing the angle of attack of said aircraft;
   means for developing a second signal representing the air mass flight path angle of said aircraft; and
   means for summing said first and second signals to obtain a first pitch signal representative of the pitch of the aircraft which is not subject to acceleration and turn errors.

2. The pitch calculating circuit of claim 1, wherein said means for developing said first signal includes:
   an angle of attack vane for developing a vane signal which is functionally related to the local air flow angle at said angle of attack vane; and
   means for combining said vane signal with a constant signal to obtain said first signal.

3. The pitch calculating circuit of claim 2, further including disconnect means for disconnecting said first combining means from said second combining means in the event of an underspeed condition of the aircraft to cause said combined pitch signal to be equal to said gyroscopic pitch signal.

4. The pitch calculating circuit of claim 2, wherein the second combining means includes error correction means for decreasing errors due to long term wind shears in said combined pitch signal.

5. The pitch calculating circuit of claim 4, wherein the error correction means includes:
   first summing means for combining said combined pitch signal and said first signal to obtain an error signal;
   filter means for filtering said error signal to obtain a correction signal; and
   second summing means for summing said correction signal and said gyroscopic pitch signal.

6. The pitch calculating circuit of claim 5, further including means for detecting a vertical wind shear, including:
   third summing means for combining said gyroscopic and first pitch signals to obtain a vertical shear signal;
   comparing means coupled to said third summing means for producing an output signal in the event a component of said vertical shear signal exceeds a predetermined limit; and
   indicator means for developing an indication of the presence of said output signal.

7. The pitch calculating circuit of claim 6, wherein said error correction means further includes disconnect means coupled to said comparing means for disconnecting said first summing means from said filter means when said output signal is produced.

8. The pitch calculating circuit of claim 1, further including a gyroscope which develops a gyroscopic pitch signal and second combining means coupled to said first combining means and to said gyroscope for combining said gyroscopic pitch signal and said first pitch signal to obtain a combined pitch signal which has a high frequency component dependent upon the gyroscopic pitch signal and a low frequency component dependent upon the first pitch signal.

9. In a head up display for the operation of an aircraft having an angle of attack signal source, an air mass flight path angle signal source and a gyroscopic pitch signal source, a pitch calculating system for stabilizing the display of symbology generated by said head up display, comprising:
   first means for combining said angle of attack signal with said flight path angle signal to obtain a first pitch signal having a long term component;
   second means coupled to said gyroscopic pitch source and said first combining means for combining said gyroscopic pitch signal and said first pitch signal to develop a calculated pitch signal having a low frequency component dependent upon said long term component and having a high frequency component dependent upon said gyroscopic pitch signal;
   a source of aircraft pitch signal referred to said head up display;
   correction signal generating means for generating a correction signal from said aircraft pitch signal and said calculated pitch signal; and
   third means for combining said correction signal and said calculated pitch signal to obtain a pitch stabilization signal for stabilizing said display.

10. The pitch calculating system of claim 9, wherein the correction signal generating means includes means for developing a long term signal representing the long term component of the pitch angle of said aircraft from said aircraft pitch signal and said calculating pitch signal.

11. The pitch calculating system of claim 10, wherein the correction signal generating means further includes means for subtracting said pitch stabilization signal from said long term signal to obtain an error signal.

12. The pitch calculating system of claim 11, wherein the correction signal generating means further includes an integrator for accumulating said error signal over time to obtain said correction signal.

13. The pitch calculating system of claim 12, wherein the correction signal generating means further includes disconnect means for disconnecting said integrator from said subtracting means to prevent loading of the integrator with false information in the event an unusual attitude or dynamic flight condition exists.

14. The pitch calculating system of claim 13, further including a hold circuit for controlling said disconnect means, including:
   means for detecting an unusual attitude or flight condition of the aircraft; and
   gating means coupled to the comparison means for controlling said disconnect means in response to said means for detecting.

15. In a head up display for the operation of an aircraft, a system for developing a pitch stabilization signal for said head up display, comprising:
   a source for developing a signal representing the angle of attack of said aircraft;
   a source for developing a signal representing a measured gyroscopic pitch angle;
   a source for developing a signal representing the air mass flight path angle of said aircraft;
   combining means for combining said angle of attack signal, said air mass flight path angle signal and said gyroscopic signal to obtain a calculated pitch signal having a low frequency component dependent upon said angle of attack signal and said flight path angle signal and a high frequency component dependent upon said gyroscopic signal;

an aircraft pitch signal source referred to the head up display;

an aircraft pitch signal source referred to the angle of attack signal source; and second combining means for combining said calculated pitch signal, said head up display referred pitch signal and said angle of attack vane referred pitch signal to obtain a pitch stabilization signal which is independent of horizontal acceleration of said aircraft.

16. The system for developing a pitch stabilization signal of claim 15, wherein the head up display referred signal source and the angle of attack referred signal source are subject to misalignment errors, and wherein the second combining means includes means for minimizing errors in said pitch stabilization signal due to said misalignment errors.

17. In a pitch calculator system for an aircraft having an error correction circuit consisting of an error signal generator, the output of which is integrated over time by an integrator to obtain a correction signal, a hold circuit for preventing loading of said integrator with false information in the event of an unusual attitude of said aircraft, comprising:

a source of aircraft pitch signal;

comparison means coupled to said pitch signal source for providing an output signal in the event said pitch signal exceeds a predetermined value; and decoupling means responsive to said comparison means for disconnecting said integrator from said error generator when said output signal is provided.

18. In a pitch calculator system for an aircraft having an error correction circuit consisting of an error signal generator, the output of which is integrated over time by an integrator to obtain a correction signal, a hold circuit for preventing loading of said integrator with false information in the event of an unusual attitude of said aircraft, comprising:

a source of aircraft vertical acceleration signal;

comparison means coupled said vertical acceleration signal source for providing an output signal in the event said acceleration signal exceeds a predetermined value; and decoupling means responsive to said comparison means for disconnecting said integrator from said error generator when said output signal is provided.

19. In a pitch calculator system for an aircraft having an error correction circuit consisting of an error signal generator, the output of which is integrated over time by an integrator to obtain a correction signal, a hold circuit for preventing loading of said integrator with false information in the event of an unusual attitude of said aircraft, comprising:

a source of aircraft longitudinal acceleration signal;

comparison means coupled to said longitudinal acceleration signal source for providing an output signal in the event said acceleration signal exceeds a predetermined value; and decoupling means responsive to said comparison means for disconnecting said integrator from said error generator when said output signal is provided.

20. In a pitch calculator system for an aircraft having an error correction circuit consisting of an error signal generator, the output of which is integrated over time by an integrator to obtain a correction signal, a hold circuit for preventing loading of said integrator with false information in the event of an unusual attitude of said aircraft, comprising:

a source of aircraft pitch signal;

a source of aircraft vertical acceleration signal;

a source of aircraft longitudinal acceleration signal;

first comparison means coupled to said pitch signal source for providing an output signal in the event said pitch signal exceeds a first predetermined value;

second comparison means coupled to said vertical acceleration signal source for providing an output signal in the event said vertical acceleration signal exceeds a second predetermined value;

third comparison means coupled to said longitudinal acceleration signal source for providing an output signal in the event said longitudinal acceleration signal exceeds a third predetermined value;

gating means coupled to said first, second and third comparison means for providing a control signal in response to at least one of said output signals from said comparison means; and decoupling means for disconnecting said integrator from said error generator when said control signal is provided.

* * * * *